(12) United States Patent
Rinz

(10) Patent No.: US 9,499,741 B1
(45) Date of Patent: Nov. 22, 2016

(54) WATER-IN-OIL MICRO-EMULSION COMPOSITIONS AND USE OF SAME FOR MINIMIZING CHANGES IN CELLULOSIC MATERIALS

(71) Applicant: The Sherwin-Williams Company, Cleveland, OH (US)

(72) Inventor: James E. Rinz, University Heights, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 501 days.

(21) Appl. No.: 13/799,935

(22) Filed: Mar. 13, 2013

(51) Int. Cl.
*B01F 17/00* (2006.01)
*C09K 15/16* (2006.01)

(52) U.S. Cl.
CPC ..................................... *C09K 15/16* (2013.01)

(58) Field of Classification Search
CPC ............................. B01F 17/00; B01F 17/0042
USPC .................................. 252/403; 516/199, 203
See application file for complete search history.

(56) References Cited

U.S. PATENT DOCUMENTS 5,338,345 A    8/1994  Scarborough et al.

OTHER PUBLICATIONS

Shyamal C. Ghosh, Holger Militz, and Carsten Mai, "Decay Resistance of Treated Wood with Functionalised Commercial Silicones", BioResources.com, 2008, 1303-1314, 3(4), BioResources, Germany.
Holger Militz, Carsten Mai, and Shyamal C. Ghosh, "Combined Effect of Hydrophobation and Durability Improvement of Wood Treated and Silicone Emulsions", 31-40.
Shyamal C. Ghosh, Holger Militz, and Carsten Mai, "Natural Weathering of Scots Pine (Pinus sylvestris L.) Boards Modified with Functionalised Commercial Silicone Emulsions", Bioresources. com, 2009, 659-673, 4(2), BioResources, Germany.

*Primary Examiner* — Edward Cain
(74) *Attorney, Agent, or Firm* — Peter T. Nguyen; James C. Scott; Daniel A. Sherwin

(57) ABSTRACT

This invention describes a treatment for wood and other cellulosic materials for minimizing the net dimensional change in the wood and/or cellulosic material between cycles of shrinking and swelling. Cycles of shrinking and swelling compromise the integrity of cellulosic materials, including wood. The water-in-oil composition disclosed herein can be used as a treatment to reduce the magnitude of the dimensional change, thereby mitigating stress and reduce cracking.

20 Claims, 11 Drawing Sheets

Sample #1 Analysis by Laser Light Scattering.

Sample #2 Analysis by Laser Light Scattering.

| Sequence Point | Width Change [%] | | |
|---|---|---|---|
| | 20.0% BTC-818 | 19.0% BTC-818 | 19.0% aqueous BTC-818 |
| After 24-hour Treatment | 7.47 | 6.95 | 8.51 |
| 24-hour Equilibration | 5.76 | 5.58 | 4.42 |
| 48-hour Equilibration | 5.82 | 5.72 | 4.48 |
| 144-hour Equilibration | 5.65 | 5.57 | 4.47 |
| 24-hour Water Soak | 8.07 | 7.66 | 8.67 |
| 24-hour Recovery | 5.88 | 5.50 | 2.19 |
| 48-hour Recovery | 5.62 | 5.48 | 1.77 |
| 72-hour Recovery | 5.67 | 5.43 | 1.69 |
| 144-hour Recovery | 5.76 | 5.57 | 1.88 |

| Sequence Point | Width Change by BTC-818 Emulsifier Content [% solids by weight] | | | | | |
|---|---|---|---|---|---|---|
| | 19.56 | 20.00 | 25.00 | 30.00 | 35.00 | 40.00 |
| After 24-hour Treatment | 8.60 | 7.15 | 7.55 | 6.63 | 6.82 | 7.33 |
| 24-hour Equilibration | 6.72 | 5.64 | 6.41 | 5.86 | 5.89 | 6.88 |
| 48-hour Equilibration | 6.61 | 5.30 | 6.15 | 5.84 | 5.83 | 7.08 |
| 120-hour Equilibration | 6.58 | 5.56 | 6.28 | 5.82 | 5.93 | 7.24 |
| 24-hour Water Soak | 8.48 | 8.72 | 8.77 | 7.70 | 8.34 | 8.55 |
| 24-hour Recovery | 6.00 | 5.97 | 7.22 | 6.66 | 7.26 | 6.29 |
| 48-hour Recovery | | 5.59 | 6.50 | 6.37 | 6.39 | 6.12 |
| 72-hour Recovery | | 5.72 | 6.58 | 6.25 | 6.31 | 6.17 |
| 144-hour Recovery | 5.86 | 5.79 | 6.46 | 6.21 | 6.32 | 6.04 |

| Sequence Point | Width Change [%] | |
|---|---|---|
| | 30.0% BTC-1010 | 24.9% DCMC |
| After 24-hour Treatment | 6.93 | 7.81 |
| 24-hour Equilibration | 5.30 | 3.32 |
| 48-hour Equilibration | 5.10 | 3.03 |
| 120-hour Equilibration | 5.28 | 2.91 |
| 24-hour Water Soak | 8.17 | 8.04 |
| 24-hour Recovery | 7.01 | 2.92 |
| 48-hour Recovery | 6.44 | 2.74 |
| 72-hour Recovery | 6.35 | 2.60 |
| 144-hour Recovery | 6.41 | 2.70 |

| Sequence Point | Width Change [%] | | |
|---|---|---|---|
| | 32.0% Acid Salt | 28.5% Acid Salt | 25.0% Acid Salt |
| After 24-hour Treatment | 7.22 | 7.99 | 7.59 |
| 24-hour Equilibration | 6.37 | 6.55 | 6.57 |
| 48-hour Equilibration | 6.64 | 6.58 | 6.45 |
| 120-hour Equilibration | 6.71 | 6.69 | 6.38 |
| 24-hour Water Soak | 8.60 | 9.45 | 8.43 |
| 24-hour Recovery | 6.36 | 6.27 | 5.59 |
| 48-hour Recovery | 5.88 | 5.60 | 5.39 |
| 72-hour Recovery | 5.87 | 5.75 | 5.43 |
| 144-hour Recovery | 5.92 | 5.68 | 5.74 |

| Sequence Point | Width Change [%] 28.63% AO-8/C-898 |
|---|---|
| After 24-hour Treatment | 7.11 |
| 24-hour Equilibration | 6.36 |
| 48-hour Equilibration | 6.35 |
| 120-hour Equilibration | 6.31 |
| 24-hour Water Soak | 7.58 |
| 24-hour Recovery | 5.89 |
| 48-hour Recovery | 5.69 |
| 72-hour Recovery | 5.73 |
| 144-hour Recovery | 5.81 |

| Sequence Point | Width Change [%] | | |
|---|---|---|---|
| | 15.34% Water | 16.66% Water | 17.89% Water |
| After 24-hour Treatment | 7.20 | 8.20 | 7.61 |
| 24-hour Equilibration | 5.13 | 5.71 | 5.60 |
| 48-hour Equilibration | 4.93 | 5.55 | 5.57 |
| 120-hour Equilibration | 4.89 | 5.51 | 5.57 |
| 24-hour Water Soak | 8.47 | 8.94 | 8.19 |
| 24-hour Recovery | 4.94 | 6.17 | 5.64 |
| 48-hour Recovery | 4.29 | 4.83 | 5.05 |
| 72-hour Recovery | 4.36 | 4.82 | 5.26 |
| 144-hour Recovery | 4.36 | 4.90 | 5.45 |

| Sequence Point | Width Change [%] |
|---|---|
| | SR-454/Gen 1121//BTC-818 |
| After 24-hour Treatment | 6.10 |
| 24-hour Equilibration | 5.81 |
| 48-hour Equilibration | 5.74 |
| 120-hour Equilibration | 5.76 |
| 24-hour Water Soak | 7.88 |
| 24-hour Recovery | 6.54 |
| 48-hour Recovery | 6.31 |
| 72-hour Recovery | 6.29 |
| 144-hour Recovery | 6.41 |

Fig. 11

| Sequence Point | Width Change [%] |
|---|---|
| | 32.0% AO-8 Salt |
| After 24-hour Treatment | 7.55 |
| 24-hour Equilibration | 6.93 |
| 48-hour Equilibration | 6.68 |
| 120-hour Equilibration | 7.03 |
| 24-hour Water Soak | 8.12 |
| 24-hour Recovery | 6.25 |
| 48-hour Recovery | 6.23 |
| 72-hour Recovery | 6.14 |
| 168-hour Recovery | 5.90 |
| 20-Day Equilibration | 6.22 |
| 2nd 24-hour Water Soak | 8.49 |
| 24-hour Recovery | 5.76 |
| 48-hour Recovery | 5.72 |
| 72-hour Recovery | 5.72 |
| 144-hour Recovery | 5.70 |
| 3rd 24-hour Water Soak | 8.62 |
| 24-hour Recovery | 5.53 |
| 48-hour Recovery | 5.22 |
| 72-hour Recovery | 5.31 |
| 144-hour Recovery | 5.34 |

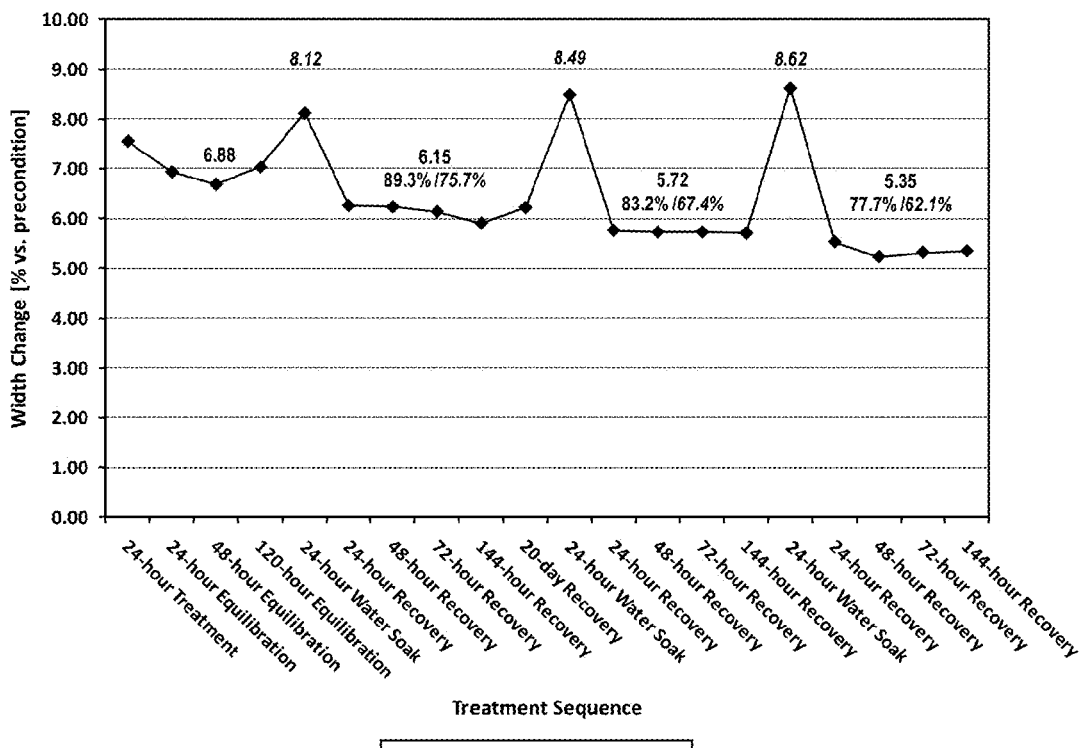

WATER-IN-OIL MICRO-EMULSION COMPOSITIONS AND USE OF SAME FOR MINIMIZING CHANGES IN CELLULOSIC MATERIALS

The present invention relates to the use of water-in-oil microemulsions (w/o ME) as a means for wood stabilization. It is further believed that the water-in-oil microemulsions described herein enable the bulking of the wood cell wall to an extent effective to minimize susceptibility to shrinking/swelling cycles.

SUMMARY OF THE INVENTION

This invention describes an emulsion having oil as the continuous phase and having water as the dispersed phase. The emulsion also includes a surfactant which functions as an emulsifier. In one embodiment, the average particle size of the dispersed phase is less than about 100 nanometers.

In one embodiment, the w/o ME includes about, 10% to 30% water by weight of total composition; 15% to 45% emulsifier by weight of total composition; and 25% to 75% oil by weight of total composition.

The w/o ME may include mineral oil as the oil that is the continuous phase of the microemulsion.

The w/o ME may also include a second surfactant. The second surfactant may include decyl alcohol, linseed oil fatty acid, octanoic acid, sorbitan monooleate, or propylene glycol monooleate. The second surfactant may also be a blend of surfactants.

The emulsifier (or primary surfactant) may also be a blend of surfactants.

Also described herein is a w/o ME that is an emulsion including a continuous oil phase and having an aqueous dispersed phase, and the emulsion further includes a first surfactant that functions as an emulsifier. In this embodiment, the aqueous dispersed phase includes water. In one example, the continuous oil phase is mineral oil. This embodiment may include about 10% to 30% water; 15% to 45% of the first surfactant; and 25% to 75% oil and a one or more additives. In one embodiment, the additive includes a second surfactant.

In yet another embodiment of the present invention, a method for the treatment of cellulosic material is described and claimed. In this embodiment, the method includes treating cellulosic material with a w/o ME that includes an emulsion having oil as the continuous phase and having water as the dispersed phase. Further the emulsion includes an emulsifier. The average particle size of the dispersed phase may be less than about 100 nanometers.

In yet another embodiment of the method of treating cellulosic material, the cellulosic material is wood.

BRIEF DESCRIPTION OF THE DRAWINGS

FIG. 11 illustrates extraction resistance of a blended emulsifier system.

DETAILED DESCRIPTION OF THE INVENTION

Wood shrinkage and swelling occurs as water leaves and enters the wood cell walls and is driven by fluctuations in relative humidity. Stabilization of wood is accomplished by minimizing this impact of water through the use of bulking agents that occupy accessible cell wall sites to the exclusion of water. The use of water-in-oil microemulsions (w/o MEs) deliver both the active bulking agent to stabilize wood as well as the means to protect the agent from water extraction in a single-step application process. W/o MEs are a system of water, oil and amphiphile which is a single optically isotropic and thermodynamically stable liquid solution. The multi-functionality of w/o MEs can be augmented by the inclusion of other additives, including co-surfactants to enhance stability of the micro-emulsion, free radical quenchers to improve wood photostability, or driers to promote the oxidative crosslinking of selected oil phase. The w/o MEs of this invention have been found to have the unique ability to deliver a bulking agent into wood while inhibiting its subsequent extraction by water. The stabilized wood surface may further permit topcoats having different characteristics that would not be possible in the absence of the w/o ME treatment described herein, because current topcoats must accommodate larger dimensional changes. Through use of the w/o ME described herein, it is believed that subsequent topcoat composition that may be applied to wood surfaces will experience increased durability.

In the w/o ME described herein, an aqueous phase is dispersed in a continuous oil phase having low viscosity. The particle size of the aqueous phase ranges from about 5 to about 100 nanometers.

Figure 1:
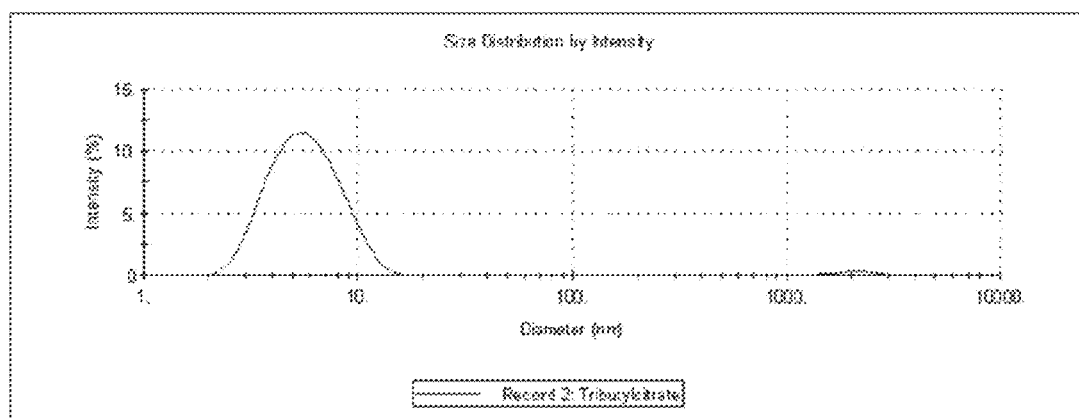
FIG. 1 illustrates the particle diameters of the w/o ME, as determined by laser light scattering.
Figure 1:
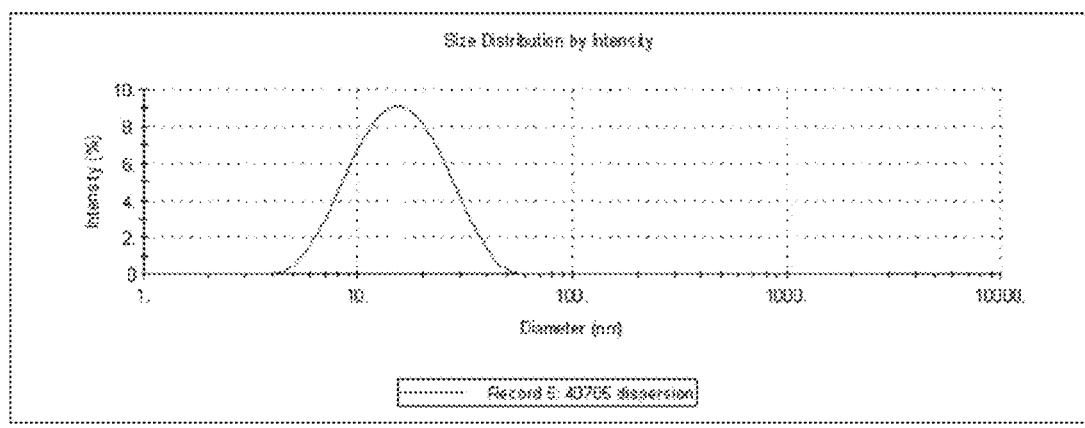

The following compositions of Table 1 were created and measured to provide examples of the particle diameters for two w/o MEs. FIG. 1 illustrates the particle sizes of the w/o ME, as determined by laser light scattering. In these particular examples, the average particle size of the dispersed phase was between 6.0 and 15.7 nm.

TABLE 1

| Component | Weight [grams] | |
|---|---|---|
| | Sample #1 | Sample #2 |
| Vertellus Citroflex 4, Tri-n-butyl citrate [RM# 125217], Lot # 88957 | 9.60 | |
| Stepan Neobee M-20 [Propylene glycol dicaprylate/dicaprate], Lot # 7425926 | | 7.50 |
| Lonza Carboquat MW-50, Lot #A8221806 | 8.40 | |

TABLE 1-continued

| | Weight [grams] | |
|---|---|---|
| Component | Sample #1 | Sample #2 |
| Koa Specialties Americas LLC, Farmin M2-1095, N-Methyl-N,N-Didecylamine, Lot # ABA-41001 | | 6.23 |
| J. T. Baker Glacial Acetic Acid, Lot #G06A16 | | 1.20 |
| Water | | 2.57 |
| Emulsifier Content [% by weight solids] | 23.33 | 42.46 |
| Water Content [% by weight] | 23.33 | 14.69 |
| Average Particle Diameter [nm., by General Model] | 6.0 | 15.7 |

The w/o ME compositions of this invention include an oil, water, and surfactant (that functions as the primary emulsifier). Oils can exhibit a range in polarity that function to fill wood lumens and inhibit water extraction of the bulking agent. Water plays the role of penetration aid for the bulking agent. In the w/o MEs described herein, water makes up about 10%-30% of the total w/o ME composition, and for example may make up about 15%-25% of the total w/o ME composition. Insufficient water content decreases the amount of bulking agent that can modify the wood cell walls, while excess water decreases the quantity of the oil continuous phase that protects the bulking agent. The aqueous phase may be water alone, or may optionally contain dissolved additives (including but not limited to calcium chloride, glycerin, free radical scavengers, polymerization initiators, or water soluble surfactants). In a similar manner, the oil phase can also be modified. Surfactants (i.e., surfactants that function as the primary emulsifier in the w/o ME described herein) include quaternary alkyl ammonium salts and acid adducts of trialkylamine salts (including but not limited to didecydimethylammonium chloride and didecylmethylammonium acetate), polyamines, and amine oxides that are proposed to function further as the bulking agent to stabilize wood. The w/o ME of this invention are thermodynamically stable due to the extraordinarily low interfacial tension between phases. They are optically transparent. The range of the solids content is between 70-90% solids by weight of total composition.

Microfibrils are the primary structural component in wood and they play a significant role in responding to moisture content. Water exists in wood in either a free or a bound state. Bound water is held between microfibrils in the cell wall by hydrogen bonding with the matrix. Free water exists as liquid and vapor in cell cavities. The Fiber Saturation Point (FSP) is the point at which no water is present in the cell lumen, but the cell wall is completely saturated. As the cell wall loses water below the FSP, pores close, the microfibrils draw closer together and shrinkage occurs. Contrarily, as the cell wall gains water and approaches the FSP, pores become larger, the microfibrils are forced apart and swelling occurs. For large pieces of wood, a distribution of moisture states occurs within cells, so not every cell is at the FSP. Problems that can occur in wood as a result of uneven shrinking/swelling include warping, micro-cracking and splitting.

It has been discovered that treatment of the wood substrate with w/o ME, has provided a substantial shrinkage control benefit and a robust resistance to water extraction. Successful mitigation of shrinkage/swelling cycles due to relative humidity fluctuations is believed to be a precursor to improved stain and topcoat durability. The described w/o ME are systems consisting of water, oil, and surfactant that are optically transparent and thermodynamically stable. These compositions provided a particularly effective package for establishing and preserving wood dimensional stabilization.

The results that were achieved through the use of w/o micro-emulsions included a five percentage point reduction in shrinkage potential in the test specimens further detailed below, while maintaining at least 75% of the initial benefit following an extraction (water soak) cycle was exceeded, even after the completion of three extraction cycles. Of the many technical approaches applied to the problem of wood shrinkage and stabilization, none appear as successful as using w/o ME treatments.

It has been discovered that stable w/o ME can be prepared using a variety of oils. The composition includes a continuous oil phase. For example, oils ranged from being low in polarity, such as mineral oil, to relatively high in polarity, such as tri-n-butyl citrate. Oils contained a variety of reactive functional groups such as in ethoxylated trimethylolpropane triacrylate, trimethylolpropane diallyl ether, epoxidized 2-ethylhexylsoyate, tung methyl ester, or linseed oil in order to permit subsequent crosslinking reactions to occur. Additional oils that may be used include butyl acetyl ricinoleate, propylene glycol dicaprylate/dicaprate, caprylic triglyceride, dehydrated castor oil acid, linseed fatty acid, linseed methyl ester. Oils can, alternatively, be blended to balance properties such as polarity, reactivity or viscosity.

Oils that can be employed in the w/o ME described herein include, but not limited to, the following categories and specific examples: hydrocarbons, such as aliphatic solvent (Calumet Specialty Products Magiesol 60) and paraffinic oil (Calumet Calpar 80); esters, such as Tri-n-butyl citrate (Vertellus Citroflex 4), Dibenzoate diester (Eastman Chemicals Benzoflex 50), and Propylene glycol dicaprylate/dicaprate (Stepan Neobee M-20); fatty esters such as butyl acetyl ricinoleate (Vertellus Flexricin P6), rapeseed methyl ester (Excalibur Kemester 213), methyl linoleate (PCAS), methyl soyate (ADM), and tung methyl ester (Sunpol 7101); epoxidized fatty esters, such as epoxidized 2-ethylhexylsoyate (Arkema Vikoflex 4050); fatty acids, such as linseed oil fatty acid (Alnor Oil Co. Inc.) and dehydrated castor oil acid (Vertellus 9-11 Acids); triglycerides, such as caprylic triglyceride (Stepan Neobee 895); drying oils, such as linseed oil (ADM Superb 1110, ADM White Refined Linseed Oil) and sucrose ester resin (Proctor & Gamble Sefose 1618U); and other oils such as ethoxylated [3] trimethylolpropane triacrylate (Sartomer SR454), trimethylolpropane diallyl ether (Perstorp TMPDE-90), and DMPA Pamolyn ester (in-house, Pamolyn 200 (Eastman Chemicals) diester of dimethylolpropionic acid). Other acrylates can also be used in the oil phase, including but not limited to, reactive acrylic and methacrylic compounds including lauryl (meth) acrylate, t-butyl (meth)acrylate, isonorbornyl (meth)acrylate.

Stable w/o ME were also prepared using various surfactants that function as the primary emulsifier. For example, the alkyl chain lengths for dialkyldimethylammonium chloride were varied, or a benzyl group could replace one of the alkyl groups. Emulsifiers were created by blending acid/base pairs such as dialkylmethylamine or dimethylalkylamine with acetic acid or octanoic acid, respectively. One system based on in-situ reactive blending of N-methyl-N,N-didecylamine with acetic acid produced stable w/o micro-emulsions and was found to be especially effective for mid- to low-polarity oils. The surfactant that functions as the primary emulsifier may be present in an amount of about 15% to about 45% by weight of total composition, and for example, may be present in an amount of about 20% to about 30% by weight of total composition.

Other reactive blending pairs of amines and acids were found to be capable of providing stable w/o micro-emulsions. Examples include the substitution of glycolic acid for acetic acid in the system above, as well as the combination of N-octyl-N,N-dimethylamine with octanoic acid. Another reactive blend approach that was very effective in forming stable w/o micro-emulsions consisted of replacing the amine with an amine oxide. Specifically, it was demonstrated that the in-situ reaction product of octyldimethylamine-N-oxide and octanoic acid was effective with methyl soyate and mineral oil as oil phases. These reactive systems were also blended with quaternary amine salts and with each other.

Although any conventionally known and used emulsifier can be used in preparation of the w/o ME described herein, examples of emulsifiers that may be used include quaternary ammonium salts such as 50% didecyldimethylammonium chloride (Lonza Bardac 2250), Dialkyl[C10]dimethylammonium chloride (Stepan BTC-1010 80%), Dialkyl (C8/C10) dimethylammonium chloride (Stepan BTC-818 80%), 80% alkylbenzyldimethylammonium chloride (Lonza Barquat MB-80), and 50% didecyldimethylammonium carbonate/bicarbonate (Lonza Carboquat MW-50). Quaternary ammonium salts useful in this invention may have the following structure:

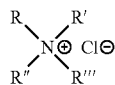

Additionally, amine/acid adducts may be used, including: Octyldimethylamine/Octanoic acid (Koa Specialties Americas LLC, Farmin DM-0898/P&G C-898), Methyldidecylamine/Glacial acetic acid (Koa Specialties Americas LLC, Farmin M2-1095/Eastman Chemicals glacial acetic acid), Methyldidecylamine/Glycolic acid (Koa Specialties Americas LLC, Farmin M2-1095/DuPont 70.0% aqueous glycolic acid), Tetradecyldimethylamine/Octanoic acid (Albemarle ADMA 14 Amine/P&G Chemicals C-898), Hexadecyldimethylamine/Octanoic acid (Albemarle ADMA 16 Amine/P&G Chemicals C-898), Dimethyl oleyl amine/Octanoic acid (Akzo Nobel Armeen DMOD/P&G Chemicals C-898), Octyldimethylamine/Linseed Oil Fatty Acid (Koa Specialties Americas LLC Farmin DM0898/Alnor Oil Co. Inc. Linseed Oil Fatty Acid), Hexadecyldimethylamine/Decanoic acid (Albemarle ADMA 16 Amine/P&G Chemicals C-1095), Dimethyl oleyl amine/Hexanoic acid (Akzo Nobel Armeen DMOD/P&G Chemicals C-698S), Decyldimethylamine/Octanoic acid (Albemarle ADMA 10 Amine/P&G Chemicals C-898), Dodecyldimethylamine/Octanoic acid (P&G Chemical AT-1295A/P&G Chemicals C-898), Decyldimethylamine/Decanoic acid (Albemarle ADMA 10 Amine/P&G Chemicals C-1095), Octyldimethylamine/Decanoic acid (Koa Specialties Americas LLC Farmin DM0898/P&G Chemicals C-1095), Dodecyldimethylamine/Decanoic acid (P&G Chemical AT-1295A/P&G Chemicals C-1095), Tetradecyldimethylamine/Decanoic acid (Albemarle ADMA 14 Amine/P&G Chemicals C-1095), Hexadecyldimethylamine/Hexanoic acid (Albemarle ADMA 16 Amine/P&G Chemicals C-698S), Tetradecyldimethylamine/Hexanoic acid (Albemarle ADMA 14 Amine/P&G Chemicals C-698S), Dodecyldimethylamine/Hexanoic acid (P&G Chemical AT-1295A/P&G Chemicals C-698S), Decyldimethylamine/Hexanoic acid (Albemarle ADMA 10 Amine/P&G Chemicals C-698S), Octyldimethylamine/Hexanoic acid (Koa Specialties Americas LLC Farmin DM0898/P&G Chemicals C-698S), Octyldimethylamine/Propionic acid (Koa Specialties Americas LLC Farmin DM0898/DOW Chemicals Propionic acid), Octyldimethylamine/Acetic acid (Koa Specialties Americas LLC Farmin DM0898/Eastman Chemicals Glacial Acetic acid), Octyldimethylamine/Methacrylic acid (Koa Specialties Americas LLC Farmin DM0898/Aldrich Methacrylic acid), and Octyldimethylamine/Acrylic acid (Koa Specialties Americas LLC Farmin DM0898/Aldrich Acrylic acid). Amine/acid adducts useful in this invention may have the following structure:

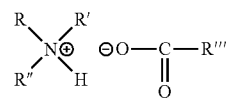

Additionally, polyamine/acid adducts may be used, such as tetraethylenepentamine/Octanoic acid (Huntsman TEPA/P&G Chemicals C-898). Polyamine/acid adducts useful in this invention may have the following structure, where x=2 to 6, and y=1 to 4:

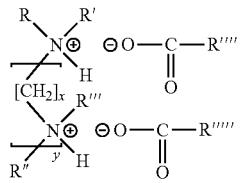

Also, amine oxide/acid adducts may be used as an emulsifier, including but not limited to Octyldimethylamine oxide/Octanoic acid (Mason Chemical Macat AO-8 or Colonial Chemical ColaLux C-8/P&G C-898), Octyldimethylamine oxide/Methacrylic acid (Mason Chemical Macat AO-8, Colonial Chemical ColaLux C-8 or Rhodia Mackamine C-8/Aldrich Methacrylic acid), Octyldimethylamine oxide/Linseed Oil Fatty Acid (Mason Chemical Macat AO-8, Colonial Chemical ColaLux C-8 or Rhodia Mackamine C-8/Alnor Oil Co. Inc. Linseed Oil Fatty Acid), Octyldimethylamine oxide/Hexanoic acid (Mason Chemical Macat AO-8, Colonial Chemical ColaLux C-8 or Rhodia Mackamine C-8/P&G Chemicals C-698S), Octyldimethylamine oxide/Propionic acid (Mason Chemical Macat AO-8, Colonial Chemical ColaLux C-8 or Rhodia Mackamine C-8/DOW Chemicals Propionic acid), and maleic acid. Amine oxide/acid adducts useful in this invention may have the following structure:

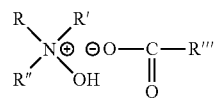

Additionally, polyacid/amine adducts may be used as an emulsifier. One such useful polyacid/amine adduct may have the following structure, where X=hydrogen, carboxylate, or alkylcarboxylate, and Z=0 to 12:

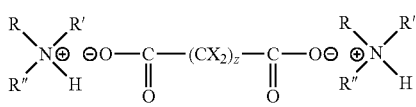

In all of the foregoing exemplary structures, R, R', R", and R''', R"", and R""' can independently be hydrogen, saturated hydrocarbon, unsaturated hydrocarbon, cycloaliphatic hydrocarbon, aromatic hydrocarbon, benzylic hydrocarbon. The sum of all R chain lengths <27.

The primary surfactant may also consist of a blend of surfactants.

The (primary) surfactant of the w/o ME composition has a dual function of first providing emulsification, then subsequently serving as the bulking agent to impart wood dimensional stabilization by displacing water from the wood cell walls, i.e., by diffusing into the wood cell walls and occupying hydrogen bonding sites to the exclusion of water. Several surfactant systems are effective as both emulsifiers and bulking agents, including but not limited to quaternary ammonium salts, fatty amine salts and fatty amine oxide adducts with acids. The water phase is believed to induce swelling sufficient to permit diffusion of the bulking agent into the wood cell walls. The w/o ME described herein includes a surfactant that primarily functions as an emulsifier. However, as further described below, additional co-surfactants may also be employed.

It has been determined that the use of co-surfactants is useful to generate stable w/o ME compositions. In general, alcohols; esters, such as sorbitan monooleate (Croda Span-80 NV LQ); fatty acids; and ester/acid can be employed as co-surfactants. Though many conventional co-surfactants can be employed for use in this invention, some of the more effective co-surfactants that were identified include decyl alcohol, linseed oil fatty acid, octanoic acid, sorbitan monooleate, and propylene glycol monooleate (BASF Loxanol EFC-200). These compounds are oil-soluble with little to no water solubility, which appeared to be advantageous for forming w/o ME since the interfacial packing of these co-surfactants with the primary emulsifier would occur on the oil side of the interface. Other molecular structures that were effective include a Gemini-type surfactant (Air Products Envirogem AD01) and the linoleic acid diester of 2,2-dimethylolpropionic acid (DMPA/Pamolyn 200 (Eastman) diester) made internally. These latter molecules contained two hydrocarbon groups branching from a hydrophilic center. It has also been found that reactive acrylic and methacrylic co-surfactants, such as, for example, hydroxyethyl acrylate, can be used. One example of a co-surfactant that can be used includes hydroxyethylmethacrylate (Aldrich).

Finally, additives can also be incorporated into w/o micro-emulsions for the purpose of either enhanced performance or functionality. Additives formulated into these systems include defoamers, metallic drier packages, biocides, UV absorbers, photoinitiators, free radical scavengers, aqueous salts, silanol oligomer, additional surfactants, amines, glycerin, diglycerine, dyes, colorants, and antimicrobials.

Light stabilizers that may be used in accordance with the present invention include Eversorb AQ-2 (Everlight USA, Inc.), Eversorb SB-1 (Everlight USA, Inc.), Suncare Concentrate (International Specialties Products, Division of Ashland), Tinuvin 292 (BASF), and Tinuvin 384-2 (BASF). Driers that may be employed include 12% Cobalt 2-ethylhexonoate (OMG Americas), Oxycoat 1101 Drier (Borchi), OXY-Coat (Borchi), 18% Zirconium 2-ethylhexonoate (OMG Americas), Additol VXW-6206 Drier (Cytec Industries). Biocides that may be used include 3-Iodo-2-propynyl-n-butylcarbamate (Lonza Omacide IPBC-100). Salts that may be employed include calcium chloride and magnesium heptahydrate. Wetting and air release additives that may be used include Tego Twin 4100 (Evonik Industries). Silicone additives that may be employed include Dynasylan Hydrosil 2926 (Evonik Industries). Other additives that may also be used include methyl ethyl ketoxime (OMG Americas) and tartaric acid (American Tartaric Products (ATP) Inc.). Photoinitiators, include, but are not limited to, methylbenzoylformate (Rahn Genocure MBF).

Additives may also be used in accordance with this invention. Functional additives that can be used include amines, such as, for example, Octyldimethylamine (Koa Specialties Americas LLC), surfonic EDA-4/80 (Huntsman) and AEPD VOX-1000 (Angus Chemical Co., division of DOW).

Moreover, amine oxide surfactants can also be employed as additives. Such surfactants that may be used include lauryldimethylamine oxide (Mason Chemicals Macat AO-12), ether amine oxide (Air Products Tomamine AO-405), and octyldimethylamine oxide (Mason Chemicals Macat AO-8 or Colonial Chemical ColaLux C-8)

Other functional additives include polyalcohols that may be used include diglycerol (Solvay Performance Chemicals) and glycerin technical grade (Perstorp).

The w/o ME composition includes oil, and may additionally include any combination of one or more of the co-surfactants and other additives described above. The w/o ME includes 30% to about 60% oil by weight of total composition. Additionally, to the extent that one or more co-surfactants or additives are utilized in the w/o ME, such co-surfactants and additives, along with the oil, make up 30% to about 60% by weight of the total composition.

Through treatment of wood with the w/o ME described herein, it has been found that the wood is less susceptible to dimensional instability. The percentage of change in the width of the wood (or other cellulosic material) is indicative of the level of the bulking of the wood cell wall. In turn, the level of bulking is indicative of the shrinking/swelling potential (i.e., dimensional change that can occur during shrinking/swelling cycles).

The w/o MEs described herein may be used for the treatment of wood, as well as other cellulosic materials that are susceptible to dimensional instability, as a means of minimizing dimensional changes in the wood and materials over time.

Procedure

There is flexibility in the procedure applicable to w/o micro-emulsions preparation. One method that was used is discussed as follows. Weigh the following components directly into a glass jar, in sequence provided: (1) oil and oil phase components; followed by, (2) emulsifier(s) and any co-surfactants; followed by, (3) aqueous phase components. Under some circumstances, the addition sequence was modified. For example, co-surfactant could be added as the final step in order to determine the quantity required to form a stable w/o ME rather than conduct a series of experiments to make that determination. Additional, additives may be added to the components described above at any time, with the understanding that it may be convenient to add certain additives to the oil phase (e.g., oil soluble additives) or to the aqueous phase (e.g., water soluble additives) as appropriate. The jar was shaken by hand after each addition to ensure that it was well dispersed. Judgments regarding stability were made visually on the day of mixing, then again after 1 to 5 days, then finally after 9 to 12 days, typically. Optical clarity equated to stability, and that determination was based on the extent to which printed words on a sheet of white paper were read through the jar without distortion.

One simple means to determine whether a w/o ME has been created (i.e., one where oil is the continuous phase), consisted of adding the proposed w/o ME, dropwise, into water. If the microemulsion droplets persist in the water, it can be concluded that the continuous phase of the microemulsion is oil and that the dispersed phase of the microemulsion is water. This process can be visually enhanced by adding water soluble dye (for example, food coloring or other dye) to the microemulsion. If the microemulsion droplets disintegrate immediately upon contact with the water, it can be concluded that a w/o ME has not been created. It should be appreciated that many tests and means can be employed to determine whether a w/o ME has been achieved.

Generally, in each of the experiments described below, a set of six (6) specimens (northern white birch, length: ~148-152 mm., width: ~16.8-17.8 mm., thickness: ~1.5-1.8 mm.) were preconditioned for at least seven (7) days in an environmental chamber at 25° C. and 50% relative humidity. Three baseline width measurements (using Caliper #H176223) were made on the lower one-third (⅓) of each specimen to provide sufficient data for statistical evaluation. Width measurements were repeated after each subsequent step in the treatment sequence.

Treatment typically included a 24-hour soak in the w/o ME, followed by equilibration for 24, 48, and 120 hours, this was followed by a 24-hour water soak and completed with equilibration for 24, 48, 72 and 144 hours. All treatments (soaking and equilibration) occurred in an environmental chamber at 25° C. and 50% relative humidity. Initial soaking with the w/o ME was conducted by placing each set of specimens into separate 4-ounce glass jars containing 100.0 to 110.0 grams of liquid to completely cover, generally, the lower one-half (½) of each sample. Water soaking (extraction) was typically conducted using 100.0 grams of water weighed into separate 4-ounce glass jars for each set of specimens. For both soaking steps, each bottle was placed into a separate 1-quart metal can, which was capped with a large waxed cup to prevent water evaporation. After each soak, the specimens were thoroughly wiped with a paper towel to remove excess liquid prior to width measurements. Three measurements were made on the portion of the treated specimens that was in direct contact with the soak fluids (submerged), typically on the lower one-third (⅓) of each specimen.

Results are reported as the percentage change versus the baseline reading and were calculated using the following equation:

% change=100*[(Treatment result−Baseline result)/ Baseline result]

Soak solution components were weighed directly into the 4-ounce glass jar used for soaking at least 16 hours prior to use. Gentle heating (≤140° F.) may be implemented in order to hasten solubilization.

Figure 2:
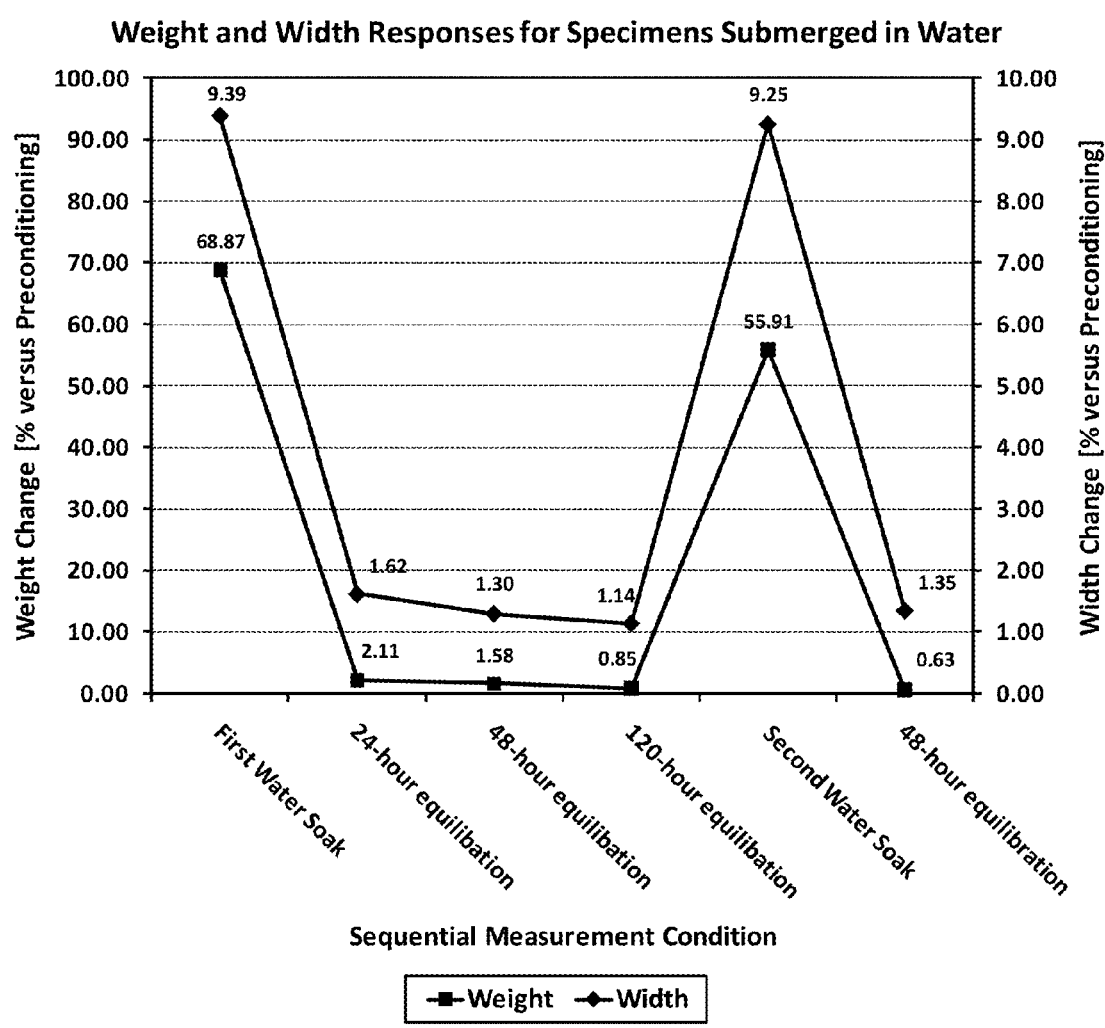
FIG. 2 illustrates treatment of specimens with water alone.

FIG. 2 illustrates treatment of specimens with water alone. Here, treatment included a 24-hour soak in the water, followed by equilibration for 24, 48, 72 and 120 hours. The treatment occurred in an environmental chamber at 25° C. and 50% relative humidity. The water soak was conducted by placing the set of six specimens into a 16-ounce Nalgene bottle containing 500.0 grams of water to completely cover the specimens. The bottle was capped and placed into an environmental chamber at 25° C. and 50% relative humidity. After the soak, the specimens were thoroughly wiped with a paper towel to remove excess liquid prior to weight and width measurements. After 120 hours of equilibration, a second water soak was conducted, using the same procedure described. This second soak was followed by equilibration for 48 hours.

Example 1

In an effort to get better insight into the extraction of emulsifier/bulking agent during water soak, results for width change following the water soak stage was considered. Results for one experiment are plotted in FIG. 3. This experiment illustrates the benefit of w/o ME by comparing BTC-818 as emulsifier/bulking agent in w/o ME system versus as use of BTC-818 directly in an aqueous solution at comparable concentrations. Table 2 shows the components and corresponding amounts of components that were utilized in this example.

TABLE 2

| Component | Weight [grams] | | |
|---|---|---|---|
| | Set #1 | Set #2 | Set #3 |
| Vertellus Citroflex 4, Tri-n-butyl citrate [RM# 125217], Lot # 88957 | 65.10 | 68.25 | |
| Stepan BTC-818 80%, dialkyl[C8/C10]dimethylammonium chloride, Lot #7485046 | 26.25 | 24.92 | 24.94 |
| Water | 13.65 | 11.83 | 80.06 |
| Solids Content [% by weight] | 82.00 | 84.00 | 19.00 |
| Emulsifier Content [% by weight] | 20.00 | 19.00 | 19.00 |
| Quantity Used [grams] | 105.00 | 105.00 | 105.00 |

Figure 3:
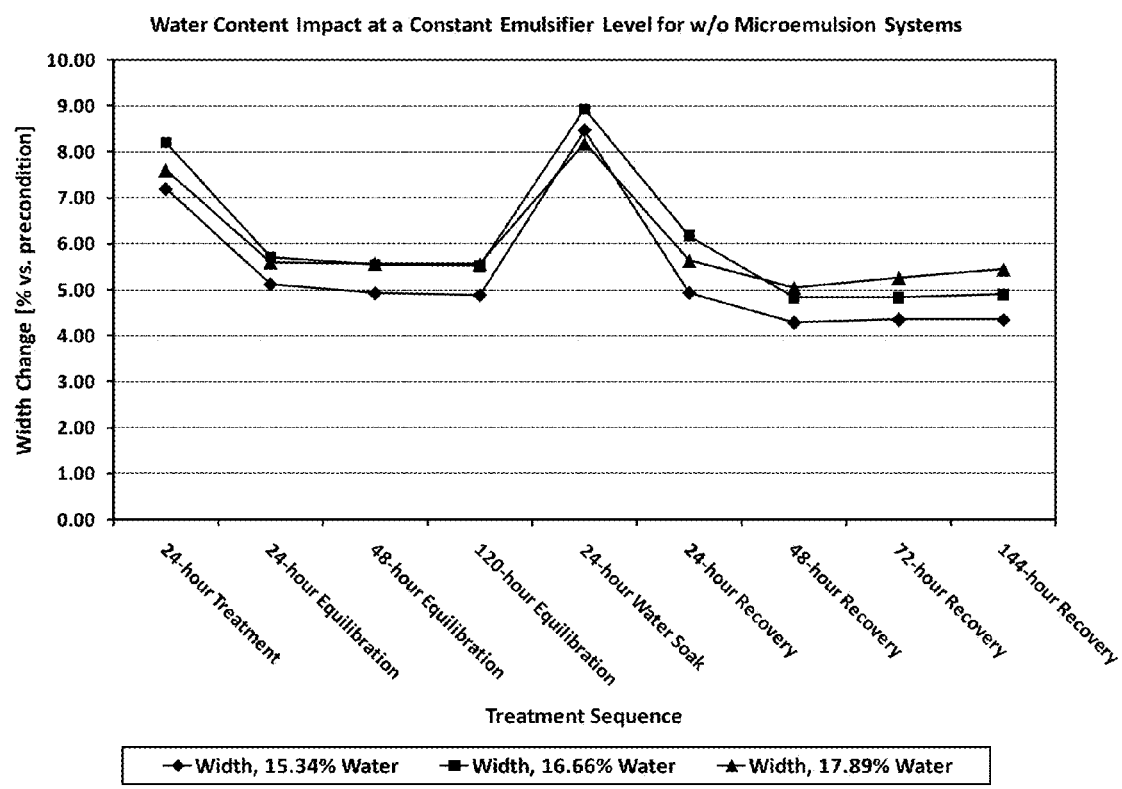
FIG. 3. illustrates the benefit of using an emulsifier as part of a w/o ME, compared with use of an emulsifier directly in an aqueous solution.

FIG. 3, illustrates the percentage of width change over a 144 hour equilibration period. Sets #1 and #2 show that w/o MEs result in more effective cell wall bulking, as measured by larger dimensional increase (i.e., greater percentage of width change in the specimens). Set #3 shows that, after 144 hour equilibration, there is about one percentage point less width increase, despite the same concentration of emulsifier, therefore, implying that there is less effective cell wall bulking.

Furthermore, following a water soak, it can be seen that sets #1 and #2 (w/o ME) maintain the width change that they experienced upon equilibration prior to the water soak (i.e., extraction inhibited by w/o ME), whereas set #3 (not a w/o ME, but merely an emulsifier in water) experiences significant decrease in bulking efficiency.

Example 2

In this experiment, the compositions shown in Table 3 were created to illustrate that there is little width response difference for w/o MEs over a large range of emulsifier (BTC-818) and solids contents.

TABLE 3

| Component | Weight [grams] | | | | | |
|---|---|---|---|---|---|---|
| | Set #1 | Set #2 | Set #3 | Set #4 | Set #5 | Set #6 |
| Vertellus Citroflex 4, Tri-n-buy citrate [RM# 125217], Lot # 88957 | 57.60 | 68.97 | 59.97 | 52.41 | 43.15 | 33.88 |
| Stepan BTC-818 80%, dialkyl[C8/C10]dimethlammonium chloride, Lot #7355904 | 26.40 | 26.25 | 32.81 | 40.50 | 47.25 | 54.00 |
| Water | 24.00 | 9.78 | 12.22 | 15.09 | 17.60 | 20.12 |
| Solids Content [% by weight] | 72.88 | 85.69 | 82.11 | 78.53 | 74.95 | 71.37 |
| Emulsifier Content [% by weight] | 19.56 | 20.00 | 25.00 | 30.00 | 35.00 | 40.00 |
| Quantity Used [grams] | 108.00 | 105.00 | 105.00 | 108.00 | 108.00 | 108.00 |

As shown in Table 3, the emulsifier content was increased to test a wide range of emulsifier concentrations to demonstrate cell wall bulking.

Figure 4:
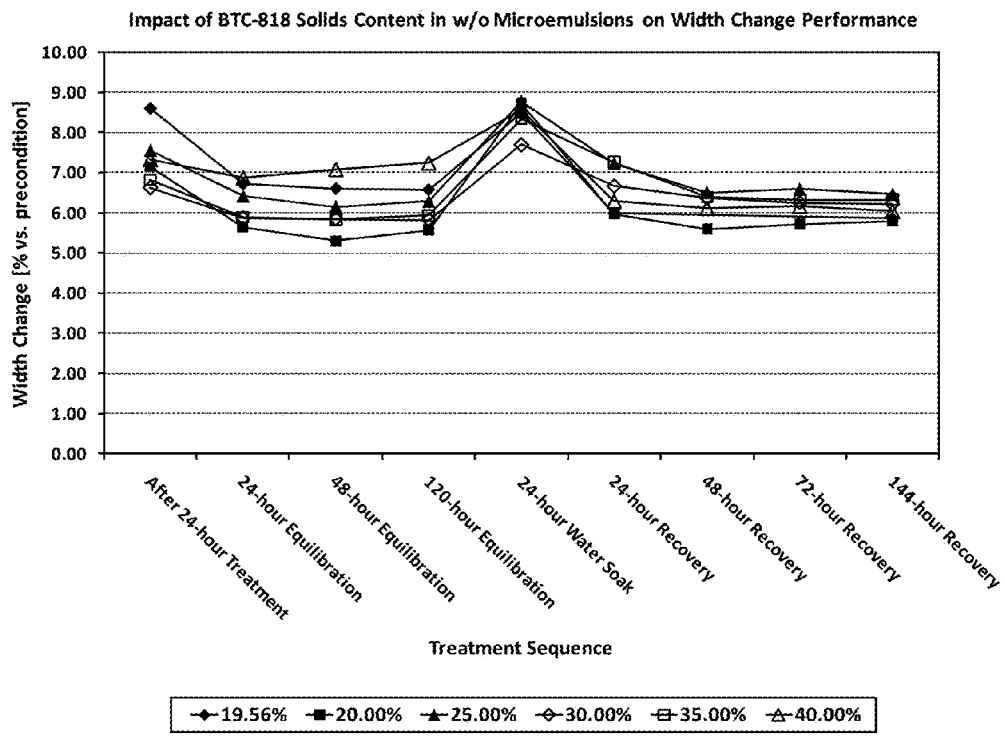
FIG. 4 illustrates effective cell wall bulking.

A percentage of width increase of 3% or more is indicative of effective cell wall bulking. As can be seen in FIG. 4, the percentage of width increase values exceed 5% both before and after water soak, demonstrating increased the bulking efficiency and retention of the bulking agent by the specimens through use of w/o MEs.

Example 3

Example 3, compositions for which are shown in Table 4, below, demonstrates that amine/acid adducts are capable of providing benefit and establishes chain length relationship to width increase. Width increase >3% is suggestive of good performance (effective cell wall bulking), which suggests that combined chain lengths of amine/acid adducts less than about 27 are useful as effective w/o MEs. Width increase >4.0% is suggestive of even better performance and is achieved at the lower combined chain length, at a value of less than about 23. The most effective performance of width increase >5.0% occurs at the combined chain length value less than about 19.

TABLE 4

| Component | Weight [grams] | | | | | | | | |
|---|---|---|---|---|---|---|---|---|---|
| | Set #1 | Set #2 | Set #3 | Set #4 | Set #5 | Set #6 | Set #7 | Set #8 | Set #9 |
| Calumet Specialty Products Magiesol 60, Lot #K0008 | 37.30 | 40.80 | 40.80 | 43.60 | 46.40 | 52.00 | 44.30 | 46.40 | 47.80 |
| P&G Chemicals C-698S, Hexanoic acid, Lot #411025153 | 11.62 | 10.50 | 9.59 | 8.89 | 8.19 | 7.70 | | | |
| P&G Chemicals C-898, Octanoic acid, Lot #KCX20491 | | | | | | | 13.09 | 11.97 | 10.99 |
| P&G Chemicals C-1095, Decanoic acid, Lot #LPD26395 | | | | | | | | | |
| Koa Specialties Americas LLC, Farmin DM0898, N,N-dimethyl-N-octylamine, Lot # AJD-10004 | 15.68 | | | | | | 14.21 | | |
| Albemarle ADMA 10 Amine, Decyldimethylamine, Lot #100000092521 | | 16.80 | | | | | | 15.33 | |
| P&G Chemicals AT-1295A, Dodecyldimethylamine, Lot #2011-10-28-Sample | | | 17.71 | | | | | | 16.31 |
| Albemarle ADMA 14 Amine, Tetradecyldimethylamine, Lot #100000129278 | | | | 18.41 | | | | | |
| Albemarle ADMA 16 Amine, Hexadecyldimethylamine, Lot #100000118482 | | | | | 19.11 | | | | |
| Akzo Nobel Armeen DMOD [dimethyl oleyl amine], Lot #SR1265417X | | | | | | 19.60 | | | |
| BASF Loxanol EFC-200, propylene glycol C18 monoester, Lot #0007862806 | 19.60 | 16.10 | 16.10 | 13.30 | 10.50 | 5.60 | 12.60 | 10.50 | 9.10 |
| Evonik Industries Tego Twin 4100, Lot #ES52115661 | 0.50 | 0.50 | 0.50 | 0.50 | 0.50 | 0.50 | 0.50 | 0.50 | 0.50 |
| Water | 20.30 | 20.30 | 20.30 | 20.30 | 20.30 | 20.30 | 20.30 | 20.30 | 20.30 |
| Water Content [% by weight] | 19.33 | 19.33 | 19.33 | 19.33 | 19.33 | 19.21 | 19.33 | 19.33 | 19.33 |
| Emulsifier Content [% by weight] | 26.00 | 26.00 | 26.00 | 26.00 | 26.00 | 25.83 | 26.00 | 26.00 | 26.00 |
| Oil + Co-surfactant + Defoamer [% by weight] | 54.67 | 54.67 | 54.67 | 54.67 | 54.67 | 54.97 | 54.67 | 54.67 | 54.67 |
| Quantity Used [grams] | 105.00 | 105.00 | 105.00 | 105.00 | 105.00 | 105.70 | 105.00 | 105.00 | 105.00 |

| Component | Weight [grams] | | | | | | | |
|---|---|---|---|---|---|---|---|---|
| | Set #10 | Set #11 | Set #12 | Set #13 | Set #14 | Set #15 | Set #16 | Set #17 |
| Calumet Specialty Products Magiesol 60, Lot #K0008 | 49.90 | 52.00 | 56.90 | 46.40 | 48.50 | 49.20 | 51.30 | 53.10 |
| P&G Chemicals C-698S, Hexanoic acid, Lot #411025153 | | | | | | | | |
| P&G Chemicals C-898, Octanoic acid, Lot #KCX20491 | 10.22 | 9.52 | 8.96 | | | | | |
| P&G Chemicals C-1095, Decanoic acid, Lot #LPD26395 | | | | 14.28 | 13.16 | 12.18 | 11.34 | 10.64 |
| Koa Specialties Americas LLC, Farmin DM0898, N,N-dimethyl-N-octylamine, Lot # AJD-10004 | | | | 13.02 | | | | |
| Albemarle ADMA 10 Amine, Decyldimethylamine, Lot #100000092521 | | | | | 14.14 | | | |
| P&G Chemicals AT-1295A, Dodecyldimethylamine, Lot #2011-10-28-Sample | | | | | | 15.12 | | |
| Albemarle ADMA 14 Amine, Tetradecyldimethylamine, Lot #100000129278 | 17.08 | | | | | | 15.96 | |

TABLE 4-continued

| | | | | | | | | |
|---|---|---|---|---|---|---|---|---|
| Albemarle ADMA 16 Amine, Hexadecyldimethylamine, Lot #100000118482 | | 17.78 | | | | | | 16.66 |
| Akzo Nobel Armeen DMOD [dimethyl oleyl amine], Lot #SR1265417X | | | 18.34 | | | | | |
| BASF Loxanol EFC-200, propylene glycol C18 monoester, Lot #0007862806 | 7.00 | 4.90 | | 10.50 | 8.40 | 7.70 | 5.60 | 3.80 |
| Evonik Industries Tego Twin 4100, Lot #ES52115661 | 0.50 | 0.50 | 0.50 | 0.50 | 0.50 | 0.50 | 0.50 | 0.50 |
| Water | 20.30 | 20.30 | 20.30 | 20.30 | 20.30 | 20.30 | 20.30 | 20.30 |
| Water Content [% by weight] | 19.33 | 19.33 | 19.33 | 19.33 | 19.33 | 19.33 | 19.33 | 19.33 |
| Emulsifier Content [% by weight] | 26.00 | 26.00 | 26.00 | 26.00 | 26.00 | 26.00 | 26.00 | 26.00 |
| Oil + Co-surfactant + Defoamer [% by weight] | 54.67 | 54.67 | 54.67 | 54.67 | 54.67 | 54.67 | 54.67 | 54.67 |
| Quantity Used [grams] | 105.00 | 105.00 | 105.00 | 105.00 | 105.00 | 105.00 | 105.00 | 105.00 |

Table 5 demonstrates equilibration width change before and after water soak, with corresponding chain length values.

TABLE 5

| Set # | Acid R— Group Chain Length [R—CO$_2$H] | Amine Total R— Group Chain Lengths [R'—N(—R")(—R''')] | Acid R—+ Amine R— Groups Chain Lengths Total [Sum] | Final Equilibrated Width Change [% vs. preconditioned specimen] | |
|---|---|---|---|---|---|
| | | | | [Before Water Soak] | [After Water Soak] |
| 1 | 5 | 10 | 15 | 5.72 | 4.76 |
| 2 | 5 | 12 | 17 | 5.40 | 5.26 |
| 3 | 5 | 14 | 19 | 5.03 | 5.09 |
| 4 | 5 | 16 | 21 | 4.55 | 5.29 |
| 5 | 5 | 18 | 23 | 2.94 | 3.75 |
| 6 | 5 | 20 | 25 | 3.37 | 3.18 |
| 7 | 7 | 10 | 17 | 5.77 | 5.53 |
| 8 | 7 | 12 | 19 | 5.86 | 5.96 |
| 9 | 7 | 14 | 21 | 4.77 | 5.45 |
| 10 | 7 | 16 | 23 | 3.71 | 4.42 |
| 11 | 7 | 18 | 25 | 2.51 | 3.41 |
| 12 | 7 | 20 | 27 | 2.87 | 3.37 |
| 13 | 9 | 10 | 19 | 4.85 | 5.19 |
| 14 | 9 | 12 | 21 | 4.98 | 5.43 |
| 15 | 9 | 14 | 23 | 3.98 | 4.59 |
| 16 | 9 | 16 | 25 | 2.49 | 2.83 |
| 17 | 9 | 18 | 27 | 2.21 | 2.48 |

Figure 5A:
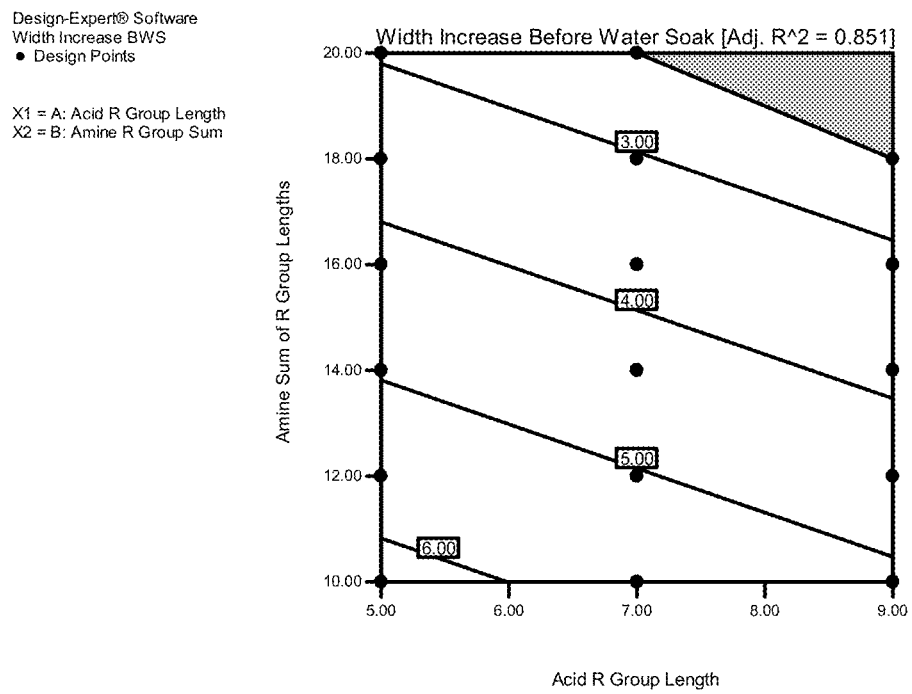
FIG. 5A is a contour plot illustrating the effect of chain length in relation to equilibrated width increase before water soak.
Figure 5B:
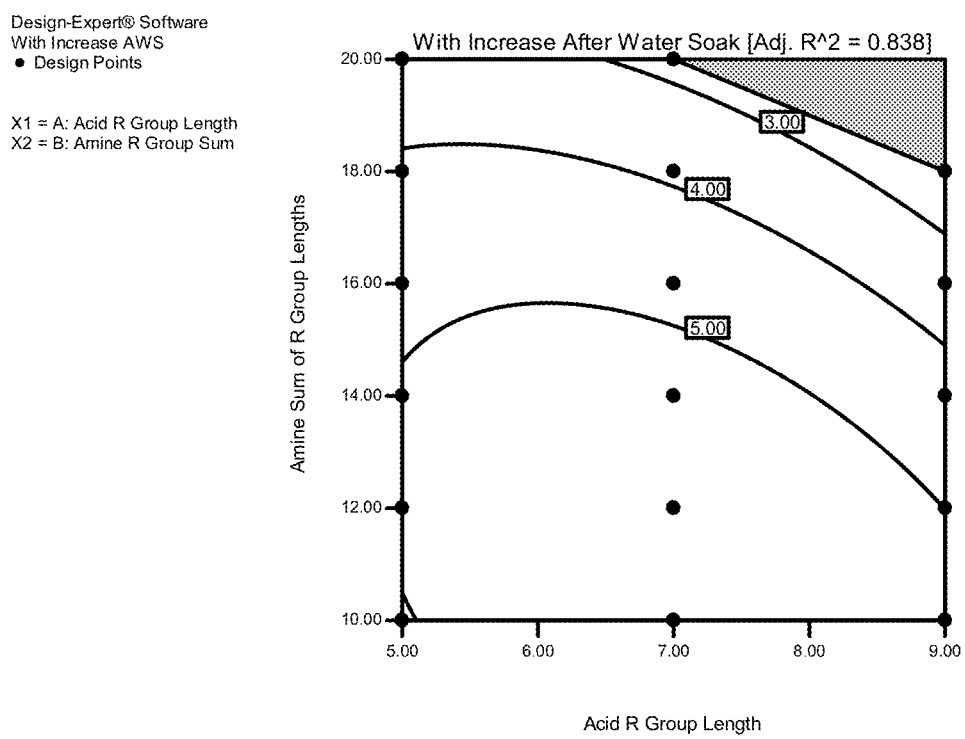
FIG. 5B is a contour plot illustrating the effect of chain length in relation to equilibrated width increase after water soak.

FIG. 5A is a contour plot depicting the results of a response surface model, which illustrates the effect of chain length in relation to equilibrated width increase before water soak. FIG. 5B is a contour plot depicting the results of a response surface model, which illustrates the effect of chain length in relation to equilibrated width increase after water soak.

Example 4

Example 4, illustrates the impact of alkyl chain lengths for quaternary ammonium chloride emulsifiers, which is consistent with the results obtained for acid/amine adducts in Example 3.

Table 6 provides the compositions that were tested in Example 4.

TABLE 6

| | Weight[grams] | |
|---|---|---|
| Component | Set #1 | Set #2 |
| Vertellus Citroflex 4, Tri-n-butyl citrate [RM# 125217], Lot # 88957 | 52.41 | |
| Calumet Specialty Products Magiesol 60, Lot #K0008 | | 52.50 |
| Stepan BTC-1010 80%, dialkyl[C10]dimethylammonium chloride, Lot #7361621 | 40.50 | |
| Croda Incroquat DCMC-LQ [68% dicetyl(C16) dimethyl ammonium chloride], Lot #0000375983 | | 38.50 |
| Water | 15.09 | 14.00 |
| Solids Content [% by weight] | 78.53 | 74.93 |
| Emulsifier Content [% by weight] | 30.00 | 24.93 |
| Quantity Used [grams] | 108.00 | 105.00 |

Figure 6:
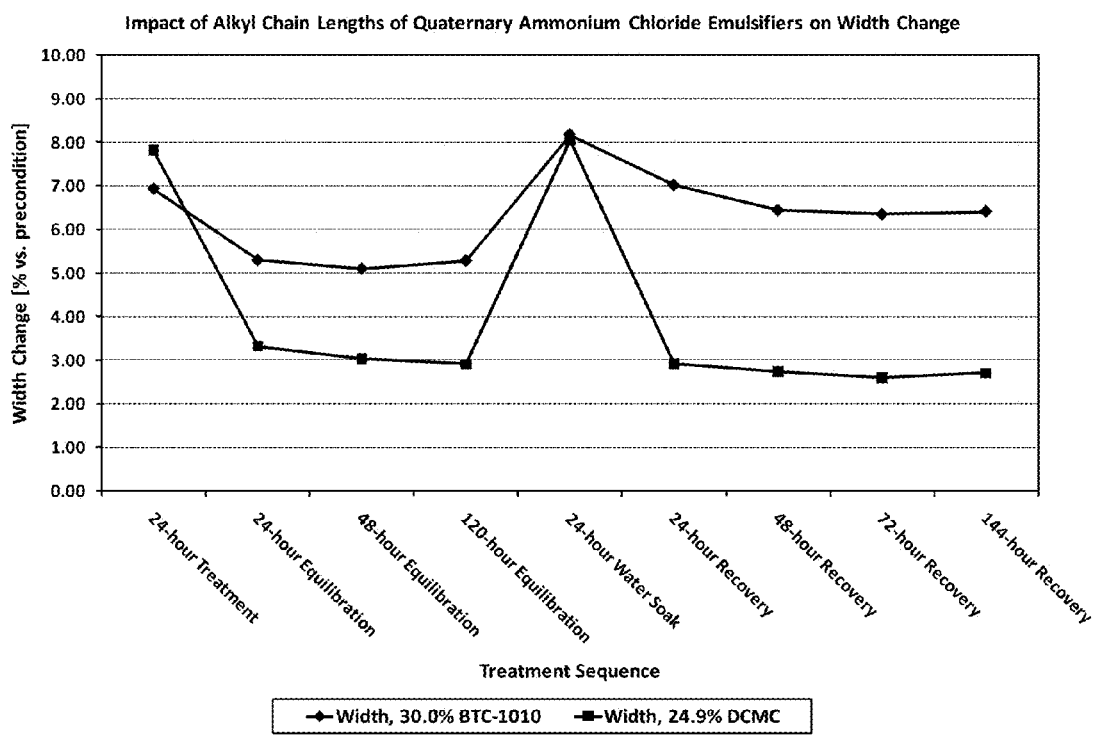
FIG. 6 illustrates the effect of alkyl chain lengths of quaternary ammonium chloride emulsifiers on width change.

FIG. 6 illustrates the effect of alkyl chain lengths of quaternary ammonium chloride emulsifiers on width change.

Example 5

Example 5 shows the width change for w/o MEs over a range of acid/amine adduct emulsifier solids content level. The difference in width change among sets is minimal. These results are consistent with the results from Example 2 showing little width change sensitivity as a function of emulsifier concentration and they are also consistent with the results from Example 3, i.e., the sum of the alkyl groups is <27.

The components in the treatment systems for each experimental set are described in Table 7 below.

TABLE 7

| | Weight [grams] | | |
|---|---|---|---|
| Component | Set #1 | Set #2 | Set #3 |
| ADM Methyl Soyate, Lot #KCBD11111937 | 42.00 | 48.09 | 52.85 |
| BASF Loxanol EFC-200, propylene glycol C18 monoester, Lot #0007862806 | 7.00 | 7.00 | 8.40 |
| P&G Chemicals C-898, Octanoic acid, Lot #KCX20491 | 16.10 | 14.35 | 12.60 |
| Koa Specialties Americas LLC, Farmin DM0898, N,N-dimethyl-N-octylamine, Lot # AJD-10004 | 17.50 | 15.61 | 13.65 |
| Water | 22.40 | 19.95 | 17.50 |
| Solids Content [% by weight] | 78.67 | 81.00 | 83.33 |
| Emulsifier Content [% by weight] | 32.00 | 28.50 | 25.00 |
| Quantity Used [grams] | 105.00 | 105.00 | 105.00 |

Figure 7:
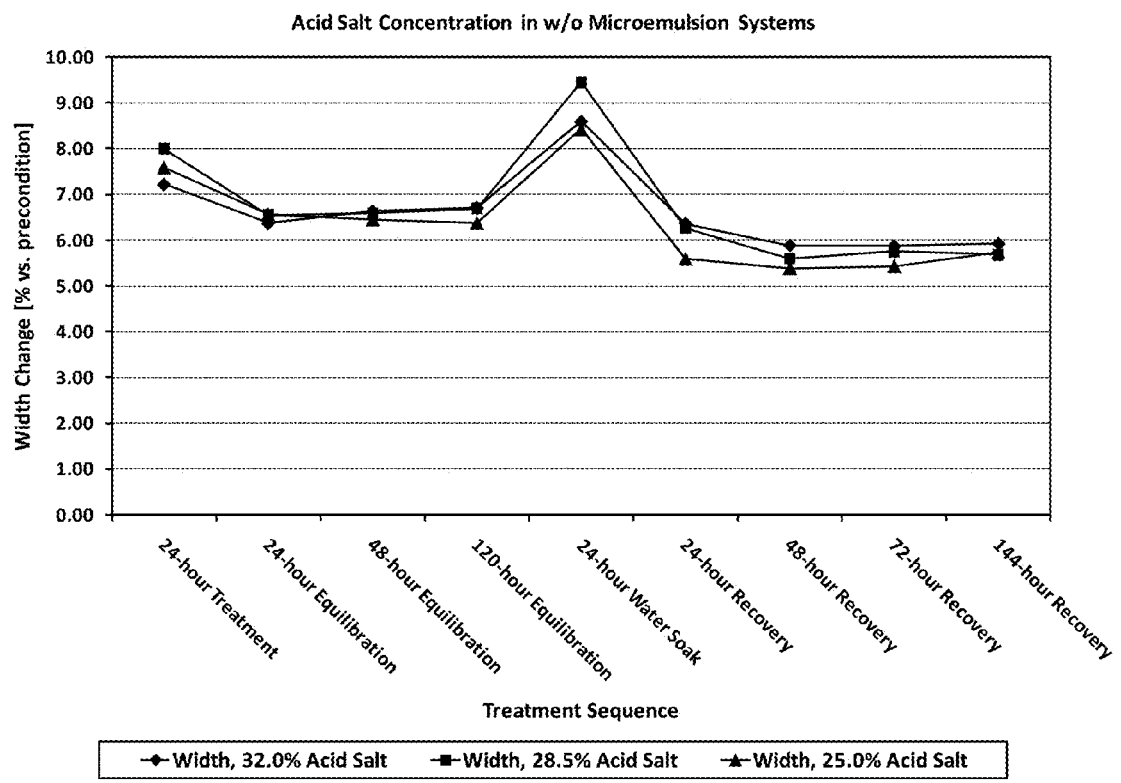
FIG. 7 shows the width change for w/o MEs over a range of acid/amine adduct emulsifier solids content level.

The results are shown in FIG. 7.

Example 6

Example 6 demonstrates that an amine oxide/acid adduct is a suitable emulsifier/bulking agent in methyl soyate, where the equilibrated width change remains >5% both before and after water soak.

The compositions used in this example are shown below in Table 8.

TABLE 8

| Component | Weight [grams] |
|---|---|
| ADM Methyl Soyate, Lot #KCBD11111937 | 50.61 |
| P&G Chemicals C-898, Octanoic acid, Lot #KCX20491 | 13.65 |
| Mason Chemical Macat AO-8 [41. 0% solids aq. Octyldimethylamine oxide], Lot #103130218 | 40.04 |
| Water | 0.70 |
| Solids Content [% by weight] | 77.50 |
| Emulsifier Content [% by weight] | 28.63 |
| Quantity Used [grams] | 105.00 |

Figure 8:
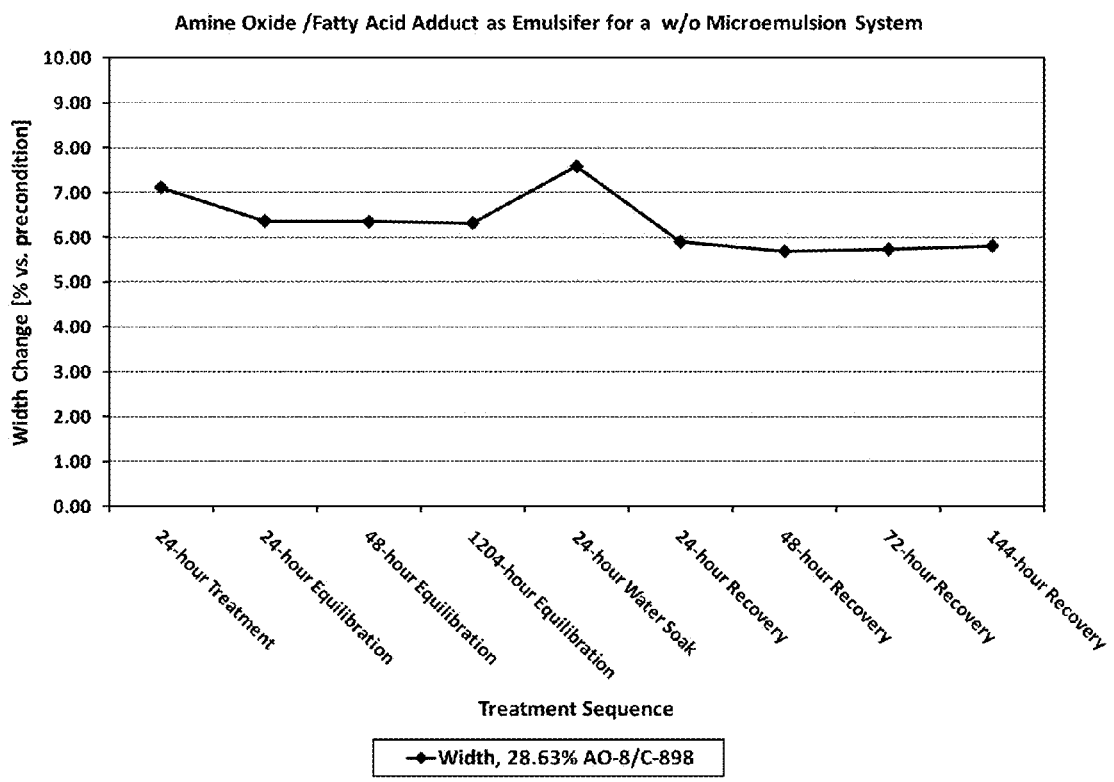
FIG. 8 demonstrates amine oxide/acid adduct as an emulsifier/bulking agent in methyl soyate.

The results are reported in FIG. 8.

Example 7

Example 7 further illustrates amine oxide/acid adduct emulsifiers in hydrocarbon solvent and shows that water content of ~15% by weight in w/o ME compositions are used to achieve an effective width increase of >4.0%.

The compositions used in this example are shown below in Table 9.

TABLE 9

| | Weight [grams] | | |
|---|---|---|---|
| Component | Set #1 | Set #2 | Set #3 |
| Calumet Specialty Products Magiesol 60, Lot #K0008 | 61.00 | 59.75 | 58.60 |
| P&G Chemicals C-898, Octanoic acid, Lot #KCX20491 | 9.75 | 9.75 | 9.75 |
| Rhodia Mackamine C-8 [41.0% solids aq. Ocydimethylamineoxide], Lot #UP2F29X06 | 28.60 | 28.60 | 28.60 |
| BASF Loxanol EFC-200, propylene glycol C18 monoester, Lot #0007862806 | 1 | 9.95 | 9.75 |
| Evonik Industries Tego Twin 4100, Lot #ES52115661 | 0.50 | 0.50 | 0.50 |
| Water | | 1.45 | 2.80 |
| Solids Content [% solids] | 84.66 | 83.34 | 82.11 |
| Emulsifier Content [% solids] | 19.52 | 19.52 | 19.52 |
| Quantity Used [grams] | 110.00 | 110.00 | 110.00 |

Figure 9:
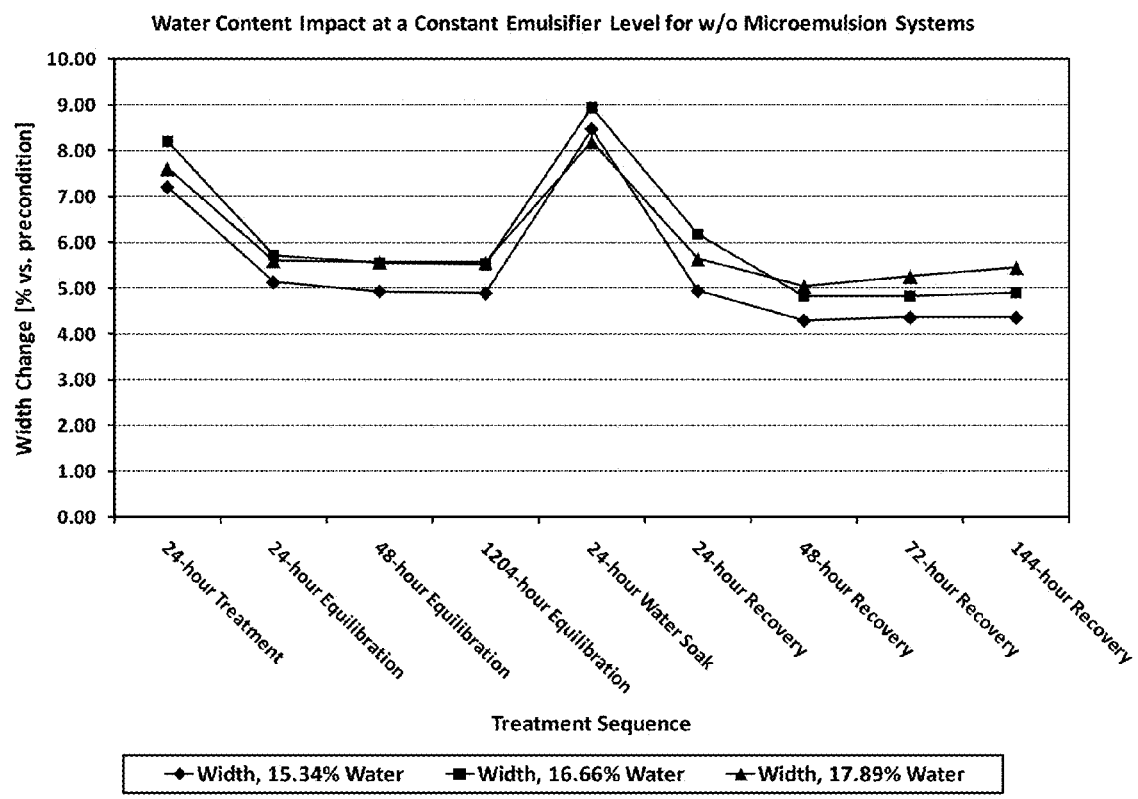
FIG. 9 illustrates amine oxide/acid adduct emulsifiers in hydrocarbon solvent.

The results are reported in FIG. 9.

Example 8

Example 8 illustrates the use of a curable acrylic oil phase. The compositions used in this example are shown below in Table 10.

TABLE 10

| Component | Weight [grams] |
|---|---|
| Sartomer SR454, Ethoxylated [3] trimethylolpropane triacrylate, Lot # KT2-1925 | 38.50 |
| Rahn Genomer 1121 [isobornyl acrylate], Lot # BA0K75870 | 19.25 |
| Stepan BTC-818 80%, dialkyl[C8/C10] dimethylammonium chloride, Lot #7485046 | 34.16 |
| Water | 13.09 |
| Solids Content [% by weight] | 81.03 |
| Emulsifier Content [% by weight] | 26.03 |
| Quantity Used [grams] | 105.00 |

Figure 10:
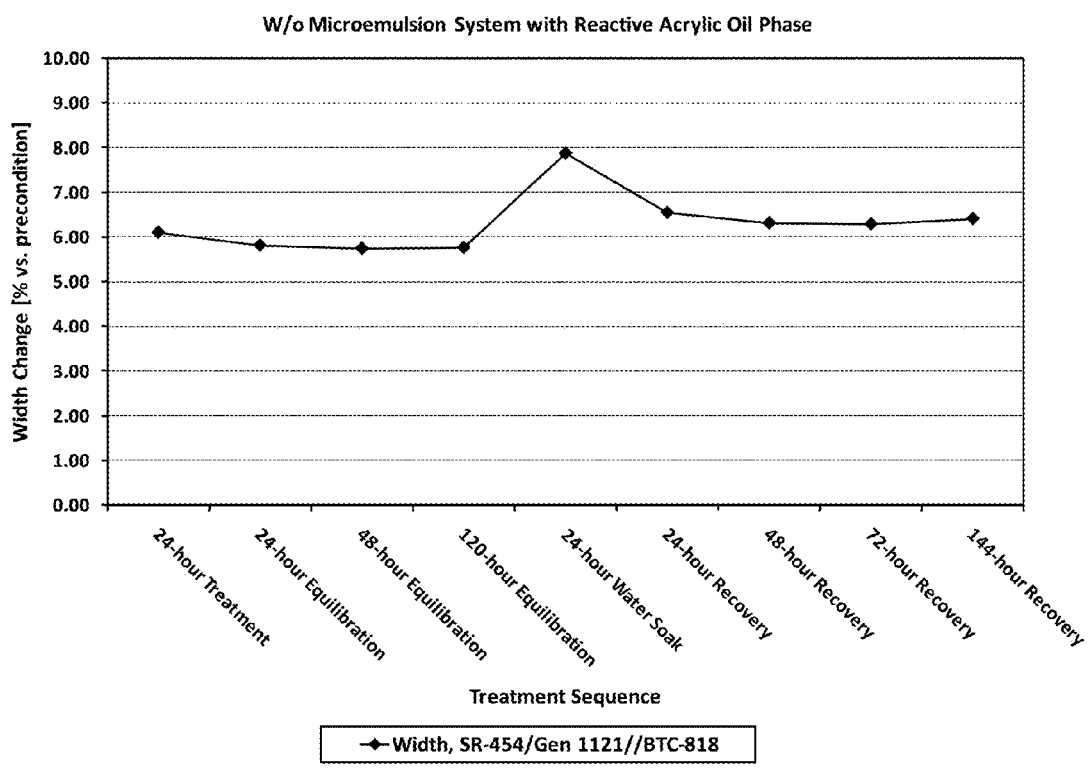
FIG. 10 illustrates the use of a curable acrylic oil phase.

The results are reported in FIG. 10.

Example 9

Example 9 illustrates extraction resistance of a blended emulsifier system. The compositions used in this example are shown below in Table 11.

TABLE 11

| Component | Weight [grams] |
|---|---|
| ADM Methyl Soyate, Lot #KCBD11111937 | 48.30 |
| P&G Chemicals C-898, Octanoic acid, Lot #KCX20491 | 11.97 |
| Evonik Industries Tego Twin 4100, Lot #ES52115661 | 0.70 |
| Mason Chemical Macat AO-8 [41.0% solids aq. Octyldimethylamine oxide], Lot #103130218 | 34.79 |
| Stepan BTC-818 80%, dialkyl[C8/C 10] dimethylammonium chloride, Lot #7485046 | 9.24 |
| Solids Content [% by weight] | 78.69 |
| Emulsifier Content [% by weight] | 32.02 |
| Quantity Used [grams] | 105.00 |

The results are reported in FIG. 11.

I claim:

1. A composition comprising an emulsion having oil as the continuous phase and having water as the dispersed phase, wherein said emulsion further contains a first surfactant, and wherein the average particle size of the dispersed phase is less than about 100 nanometers.

2. The composition of claim 1, wherein said first surfactant functions as an emulsifier.

3. The composition of claim 1, comprising
10% to 30% water by weight of total composition;
15% to 45% first surfactant by weight of total composition;
25% to 75% oil by weight of total composition.

4. The composition of claim 2, wherein the emulsifier includes R, R', R", and R'" groups comprising the structure:

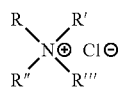

wherein R, R', R", and R'" are selected from the group consisting of hydrogen, saturated hydrocarbon, unsaturated hydrocarbon, cycloaliphatic hydrocarbon, aromatic hydrocarbon, benzylic hydrocarbon,
and wherein a total chain length of the R, R', R", and R'" groups is less than 27.

5. The composition of claim 2, wherein the emulsifier includes R, R', R", and R'" groups comprising the structure

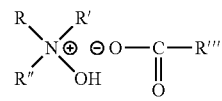

wherein R, R', R", and R'" are selected from the group consisting of hydrogen, saturated hydrocarbon, unsaturated hydrocarbon, cycloaliphatic hydrocarbon, aromatic hydrocarbon, benzylic hydrocarbon,
and wherein a total chain length of the R, R', R", and R'" groups is less than 27.

6. The composition of claim 2, wherein the emulsifier includes R, R', R", and R'" groups comprising the structure

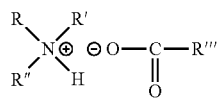

wherein R, R', R", and R'" are selected from the group consisting of hydrogen, saturated hydrocarbon, unsaturated hydrocarbon, cycloaliphatic hydrocarbon, aromatic hydrocarbon, benzylic hydrocarbon,
and wherein a total chain length of the R, R', R", and R'" groups is less than 27.

7. The composition of claim 2, wherein the emulsifier includes R, R', R", R'", R"", R""' groups comprising the structure

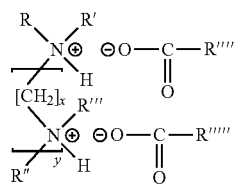

wherein R, R', R", R'", R"", R""' are selected from the group consisting of hydrogen, saturated hydrocarbon, unsaturated hydrocarbon, cycloaliphatic hydrocarbon, aromatic hydrocarbon, benzylic hydrocarbon,
wherein x=2 to 6, and y=1 to 4; and
wherein a total chain length of the R, R', R", R'", R"", R""' groups is less than 27.

8. The composition of claim 2, wherein the emulsifier includes R, R', and R" groups comprising the structure

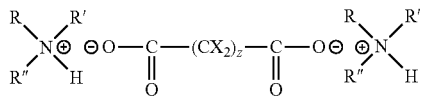

wherein R, R', and R" are selected from the group consisting of hydrogen, saturated hydrocarbon, unsaturated hydrocarbon, cycloaliphatic hydrocarbon, aromatic hydrocarbon, benzylic hydrocarbon,
wherein X=hydrogen, carboxylate, or alkylcarboxylate,
wherein Z=0 to 12;
and wherein a total chain length of the R, R', R" groups is less than 27.

9. The composition of claim 3, wherein the first surfactant is a blend of surfactants.

10. The composition of claim 1, comprising:
10% to 30% water by weight of total composition;
15% to 45% first surfactant by weight of total composition;
25% to 75% oil and one or more additive by weight of total composition.

11. The composition of claim 10, wherein the additive includes a surfactant selected from the group consisting of decyl alcohol, linseed oil fatty acid, octanoic acid, sorbitan monooleate, and propylene glycol monooleate.

12. A composition comprising an emulsion having a continuous oil phase and having an aqueous dispersed phase, wherein said emulsion further contains a first surfactant that functions as an emulsifier, and wherein the average particle size of the dispersed phase is less than about 100 nanometers.

13. The composition of claim 12, wherein the aqueous dispersed phase includes water.

14. The composition of claim 13, comprising
10% to 30% water by weight of total composition;
15% to 45% of the first surfactant by weight of total composition; and
25% to 75% oil and one or more additive, by weight of total composition.

15. The composition of claim 14, wherein said additive includes a second surfactant.

16. The composition of claim 14, wherein the oil is mineral oil.

17. A method for the treatment of cellulosic material, wherein said method comprises treating the cellulosic material with a composition, wherein said composition includes an emulsion having oil as the continuous phase and having water as the dispersed phase, and wherein said emulsion further includes an emulsifier, and wherein the average particle size of the dispersed phase is less than about 100 nanometers.

18. The method of claim 17, wherein said cellulosic material is wood.

19. The method of claim 18, wherein said composition further includes a surfactant.

20. The method of claim 17, wherein
the continuous phase is 25% to 75% by weight of total composition;
the dispersed phase 10% to 30% water, by weight of total composition; and
the emulsifier is 15% to 45% by weight of total composition.

* * * * *

UNITED STATES PATENT AND TRADEMARK OFFICE
CERTIFICATE OF CORRECTION

| | |
|---|---|
| PATENT NO. | : 9,499,741 B1 |
| APPLICATION NO. | : 13/799935 |
| DATED | : November 22, 2016 |
| INVENTOR(S) | : James E. Rinz |

It is certified that error appears in the above-identified patent and that said Letters Patent is hereby corrected as shown below:

In the Specification

Column 15, Line 37, please delete "1" and replace with --10.15--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*